(12) United States Patent
Hombsch et al.

(10) Patent No.: US 12,027,943 B2
(45) Date of Patent: Jul. 2, 2024

(54) ELECTRIC AXLE ASSEMBLY

(71) Applicant: Dana Heavy Vehicle Systems Group, LLC, Maumee, OH (US)

(72) Inventors: Maximilian Hombsch, Begijnendijk (BE); Steven Vanhee, Staden (BE); Darren J. Ziskovsky, Bowling Green, OH (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 202 days.

(21) Appl. No.: 16/938,737

(22) Filed: Jul. 24, 2020

(65) Prior Publication Data

US 2021/0044172 A1 Feb. 11, 2021

Related U.S. Application Data

(60) Provisional application No. 62/882,673, filed on Aug. 5, 2019.

(51) Int. Cl.
*H02K 5/20* (2006.01)
*H02K 1/32* (2006.01)
*H02K 9/197* (2006.01)

(52) U.S. Cl.
CPC .............. *H02K 5/20* (2013.01); *H02K 1/32* (2013.01); *H02K 9/197* (2013.01)

(58) Field of Classification Search
CPC ............ H02K 9/197; H02K 1/32; H02K 5/20; H02K 5/203; H02K 1/20
See application file for complete search history.

(56) References Cited

U.S. PATENT DOCUMENTS

| | | | |
|---|---|---|---|
| 2,862,120 A | 11/1958 | Onsurd | |
| 3,009,072 A | 11/1961 | Mossay | |
| 3,531,668 A * | 9/1970 | Cathey | G01R 31/343 310/58 |
| 5,859,482 A | 1/1999 | Crowell et al. | |

(Continued)

FOREIGN PATENT DOCUMENTS

CN 109194035 A * 1/2019 ............... H02K 1/20

OTHER PUBLICATIONS

Chen (CN 109194035 A) English Translation (Year: 2019).*

*Primary Examiner* — Tulsidas C Patel
*Assistant Examiner* — Robert E Mates
(74) *Attorney, Agent, or Firm* — McCoy Russell LLP

(57) ABSTRACT

An electric motor cooling jacket enclosing a surface of an electric motor stator and having protuberances adapted for contact with the surface of the stator, with fluid passageways formed by the cooling jacket body, the protuberances, and the surface of the electric motor stator, wherein the fluid passageways are arranged to permit a cooling fluid to flow in a serpentine path across the surface of the stator to remove heat from the stator. Spray rings are fluidly coupled with the fluid passageways so as to permit the cooling fluid to flow into the fluid passageways, across the outer circumference of the electric motor stator, and out from orifices in the spray rings to cool the windings of the stator. The protuberances are formable using a pair of mold halves aligned anti-symmetrically with one another so that a serpentine fluid path is formed when casting the cooling jacket body.

20 Claims, 9 Drawing Sheets

(56) References Cited

U.S. PATENT DOCUMENTS

| | | |
|---|---|---|
| 8,161,643 B2 | 4/2012 | Smith et al. |
| 8,525,375 B2 | 9/2013 | Pal |
| 8,686,606 B2 | 4/2014 | Jiang et al. |
| 9,356,492 B2 | 5/2016 | Chamberlin et al. |
| 9,450,468 B2 | 9/2016 | Chamberlin et al. |
| 9,893,593 B2 | 2/2018 | Sugimoto et al. |
| 2008/0185924 A1* | 8/2008 | Masoudipour ......... H02K 5/203 29/890.035 |
| 2009/0102298 A1* | 4/2009 | Savant ..................... H02K 9/19 310/52 |
| 2013/0126143 A1 | 5/2013 | Sheu et al. |
| 2013/0300229 A1 | 11/2013 | Müller et al. |
| 2017/0141653 A1 | 5/2017 | Okazaki et al. |
| 2017/0346370 A1 | 11/2017 | Sentis et al. |
| 2019/0006908 A1 | 1/2019 | Scharlach |
| 2019/0006914 A1* | 1/2019 | Graves .................. F16H 57/046 |

* cited by examiner

ELECTRIC AXLE ASSEMBLY

CROSS-REFERENCE TO RELATED APPLICATION

The present application claims priority to U.S. Provisional Application No. 62/882,673, entitled "ELECTRIC AXLE ASSEMBLY", and filed on Aug. 5, 2019. The entire contents of the above-listed application are hereby incorporated by reference for all purposes.

FIELD

The present disclosure relates to an electric motor for use in an electric axle assembly. More particularly, the present disclosure relates to a cooling jacket for an electric motor.

BACKGROUND AND SUMMARY

Certain vehicles are lending themselves to the use of electric motors as the single or supplemental source of rotational energy to move the vehicle over the ground. Some vehicles, such as heavy trucks, benefit from the use of electric motors to reduce the need for or eliminate internal combustion engines (ICE's), thus reducing or eliminating fuel costs, pollution and complexity, and other disadvantages with internal combustion engines.

To propel a vehicle, the electric motor typically needs to have a high torque capacity and operate over a wide range of speeds. Expanding the operating range of electric motors is desirable to fulfill the requirements of vehicle operation. Current electric motor designs have thermal limitations preventing the expansion of operating torque and speed for a given motor size, thus improvements in cooling electric motors during operation is desirable.

Traction electric motors, such as those usable as or in an electric axle assembly, may comprise a stator that is affixed to a static or stationary portion of the vehicle, and a rotor that is adapted to rotate with respect to the stator to provide rotational energy for the vehicle. The stator may comprise, for example, a (hollow) cylindrical core with conductive windings. During operation, the stator core material and windings develop considerable heat, which may limit various operating/performance characteristics of the motor.

To address and overcome at least some of the undesirable aspects of the heat generated by the motor, the inventors herein developed embodiments of an electric axle assembly with a cooling jacket that permits a cooling oil to flow between inner surfaces of the cooling jacket and the exterior surface of an electric motor stator. In one aspect, the cooling comprises a cylindrical body having a first plurality of protuberances (or raised embossments adapted to create fluid flow channels/passageways) arrayed radially on an inner periphery of the body, the first plurality of protuberances in contact with an outer circumference of the stator; a second plurality of protuberances arrayed radially on an inner periphery of the body and aligned anti-symmetrically with the first plurality of protuberances, the second plurality of protuberances in contact with the outer circumference of the stator, wherein the first plurality and the second plurality of protuberances form a plurality of passages for a cooling fluid; an inlet passage connected to one of the plurality of passages; and an outlet passage connected to one of the plurality of passages. In one aspect the cooling oil flows in a serpentine passageway formed in the inner surface of the cooling jacket, for removing heat from the stator exterior surface. In one aspect, cooling oil flows from the serpentine passageway and over an outer diameter of radial cooling plates or rings comprising the sides of the serpentine passageway, or radial end plates, through opening in the cooling rings, with the cooling oil directed to (spray upon) the windings of the electric motor stator, for cooling the windings.

In another aspect, a method for forming a cooling jacket for an electric motor comprises the steps of assembling a first cylinder core to a second cylinder core, wherein the first cylinder core and the second cylinder core each have a cylindrical body having a plurality of protuberances arrayed radially on an outer rim of the bowl-shaped body, wherein the first cylinder core has a first plurality of protuberances and the second cylinder core has a second plurality of protuberances; aligning the first plurality of protuberances to the second plurality of protuberances in an antisymmetric alignment forming a mold assembly; and casting molten material into the mold assembly forming a cast cooling jacket.

In another aspect, an electric motor assembly comprises a non-rotatable stator having a plurality of windings attached to the non-rotatable stator; a rotor arranged coaxially and radially inward of the non-rotatable stator; a shaft coupled to the rotor, where the shaft transmits rotational power; a cooling jacket enclosing the non-rotatable stator, wherein the cooling jacket has a cylindrical body coupled to a sump housing, the cooling jacket comprising a plurality of protuberances arrayed radially on an inner periphery of the cylindrical body, the plurality of protuberances in contact with an outer circumference of the stator forming a plurality of passages; a first spray ring coupled to one end of the cooling jacket; a second spray ring coupled to a second end of the cooling jacket; a first housing member coupled to the cooling jacket, wherein the first housing member couples to the first spray ring to form a first fluid channel; and a second housing member coupled to the cooling jacket, wherein the second housing member couples to the second spray ring to form a second fluid channel.

In another aspect, a spray ring for an electric motor having a stator comprises an annular ring having an inner periphery and an outer periphery; a plurality of orifice openings arrayed radially about the inner periphery, the orifice openings intersecting the inner periphery and the outer periphery in an oblique angle; a radial piloting surface located on the inner periphery, the radial piloting surface adapted to couple to the stator; an axial piloting surface located on the inner periphery, the axial piloting surface arranged perpendicular to the radial piloting surface, the axial piloting surface adapted to couple to the stator; and a channel located on the outer periphery, the channel intersecting the plurality of orifice openings, the channel located at a distal location from the axial piloting surface.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE SEVERAL VIEWS OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way. The above, as well as other advantages of the present disclosure will become readily apparent to those skilled in the art from the following detailed description when considered in the light of the accompanying drawings in which:

FIGS. 1-4 and 8-12 are shown with components in proportional size with one another, according to some embodiments.

DETAILED DESCRIPTION

It is to be understood that the present disclosure may assume various alternative orientations and step sequences, except where expressly specified to the contrary. It is also to be understood that the assemblies, devices, and methods illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise.

The present inventors recognized that the power density of electric motors is largely dependent on the cooling technology associated with the electric motors, and the present inventors discovered that by utilizing an oil cooled motor a substantial (such as, for example, possibly greater than 20%) increase in power density might be achieved for the same size of motor. The present inventors further recognized, discovered, and developed components and component assemblies for cooling an electric motor stator and windings associated therewith, and methods for manufacturing oil cooling channels in a cast housing so as to minimize machining and the number of component parts in the electric axle assembly.

Figure 1:
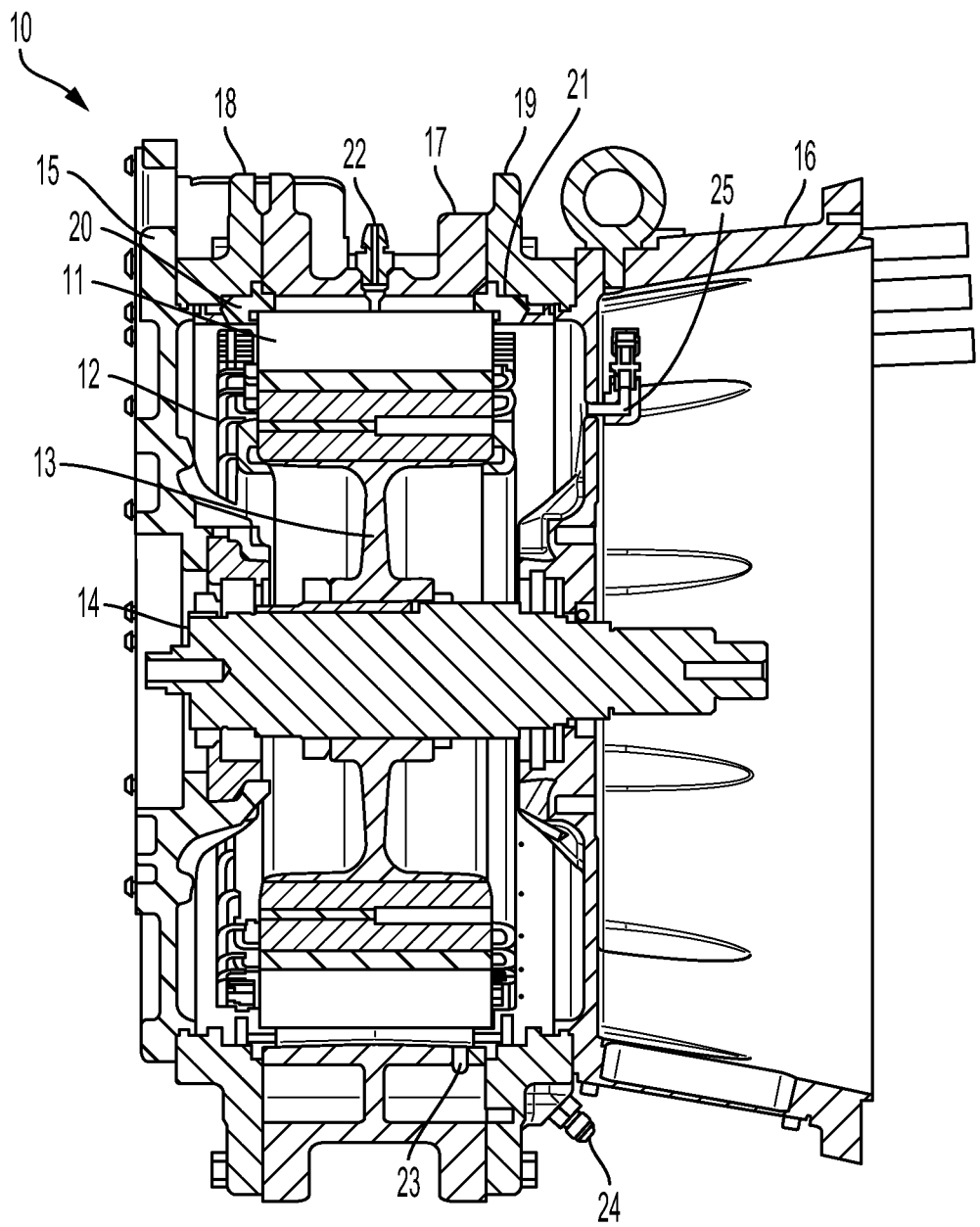
FIG. 1 is a cross-sectional view of an embodiment of an electric motor used in an electric axle assembly in accordance with an embodiment of the present disclosure.

As shown in the figures, and particularly in FIG. 1, an electric axle assembly according to embodiments involves a cast cylindrical cooling jacket sized and shaped so as to provide cooling oil flow passageways across the cylindrically shaped exterior surfaces of an electric motor stator. Oil flows through an inlet port on the top of the motor, and flows through the (serpentine, or meandering) cooling channels between the oil (cooling) jacket and the stator of the motor to pull heat away from the stator assembly during operation. At the end of each of the flow channels (best seen in FIGS. 3, 4, 11 and 12), the flow terminates into (oppositely oriented) radial end plates (or radial cooling plates or rings) that include drilled holes or machined orifices (or formed through holes) to distribute (or spray) the oil to the windings (on each side) of the stator assembly (thereby cooling the stator windings). The oil then flows to the sump from the main cavity of the assembly.

Figure 5:
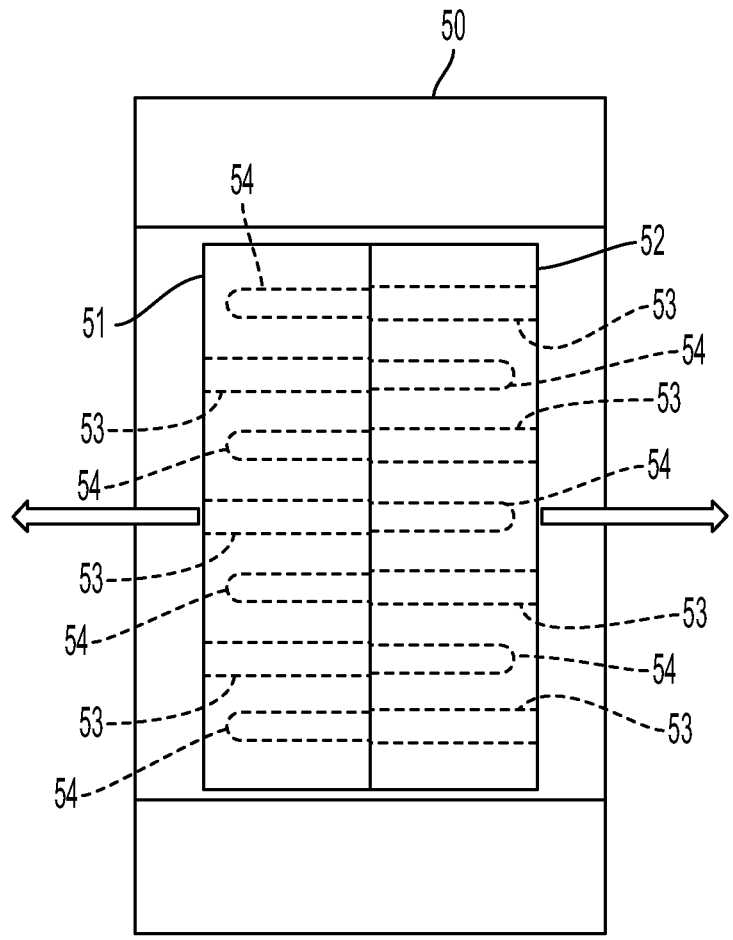
FIG. 5 is a schematic view a casting mold used to produce the cooling jacket of FIG. 3.

The flow channels are preferably created directly during a casting process. FIG. 5 shows the channels of an oil jacket with a cast geometry, which allows a (manufacturing) machining center to only need to clean up (or finish) the edge dimensions, as well as (finish) the inner diameter (ID) press fit of the cooling channel "fingers." The parting line is shown down the middle 47 of the part in which there may be two casting cores that may be used to create the internal geometry (of the channels). A final machining may be used to clean up the ID of the "fingers" as well as the axial face for the mating component geometry. The design of the cooling jacket is preferably antisymmetric in nature, which the present inventors determined allows the use of two identical dies (or mold halves), one on each side of the parting line.

Turning now to describe the figures in greater detail, an electric motor 10 is illustrated in FIG. 1. The electric motor 10 may be utilized as an electric axle assembly, electric drive axle, or a primary drive transmission in a vehicle (not shown). The electric axle assembly may have applications in commercial vehicles, both light duty and heavy duty vehicles, and for passenger, off-highway, and sport utility vehicles. Additionally, the electric motor 10 may be adapted for use in front and/or rear driving axles, and steerable and non-steerable axles. It would be understood by one of ordinary skill in the art that the electric motor 10 may also have industrial, locomotive, military, agricultural, and aerospace applications.

In one embodiment, the electric motor 10 is provided with a stator 11 supporting a number of windings 12. The stator 11 and the windings 12 are coaxial with a rotor 13. The electric motor 10 is provided with a shaft 14 coupled to the rotor 13.

In one embodiment, the stator 11, the windings 12, the rotor 13, and the shaft 14 are enclosed by a motor housing 15. In one embodiment, the motor housing 15 includes a number of housing members attached together to form a structural enclosure to the internal components of the electric motor 10. In one embodiment, the motor housing 15 is configured to support and seal the shaft 14. In one embodiment, the shaft 14 may partially extend from the motor housing 15 on either or both sides to allow rotational power transmission from the shaft 14 to components outside of the motor housing 15.

In one embodiment, the motor housing 15 is coupled to a transmission housing 16. The transmission housing 16 is adapted to support and enclose internal transmission components such as, for example, gearing, clutches, shafts, among others for manipulating speed and torque produced by the electric motor 10.

In one embodiment, the motor housing 15 is an assembly including a cooling jacket 17 coupled to a first housing member 18 on a first end and coupled to a second housing member 19 on a second end. In some embodiments, the first housing member 18 may be an assembly of multiple parts. In other embodiments, the first housing member 18 is a single component. In some embodiments, the second housing member 19 may be an assembly of multiple parts. In other embodiments, the second housing member 19 is a single component.

In one embodiment, the cooling jacket 17 is positioned radially outward of, and coupled to the stator 11. The cooling jacket 17 is coupled to a first spray ring 20 on the first end. The cooling jacket 17 is coupled to a second spray ring 21 on the second end.

In one embodiment, the cooling jacket has an inlet passage, such as inlet passage 22, that comprises a central cooling fluid supply for serpentine cooling fluid passageways along each side of the cooling jacket, allowing cooling fluid to flow downward on each side of the cooling jacket (e.g, via a clockwise passageway and a counter-clockwise passageway). In one embodiment, the cooling jacket 17 has an inlet passage 22 and an outlet passage 24 at a distal location from the inlet passage 22. In one embodiment, the second housing member 19 is provided with a housing vent passage 25. In one embodiment, the inlet is adapted and oriented so as to permit cooling fluid to (gravitationally) flow from the inlet toward the outlet passage. In one embodiment, the cooing fluid is oil. In some embodiments, the cooling fluid comprises oil, or a water-glycol mixture, or a water/water-based coolant, or a coolant fluid with a corrosion inhibitor.

Figure 2:
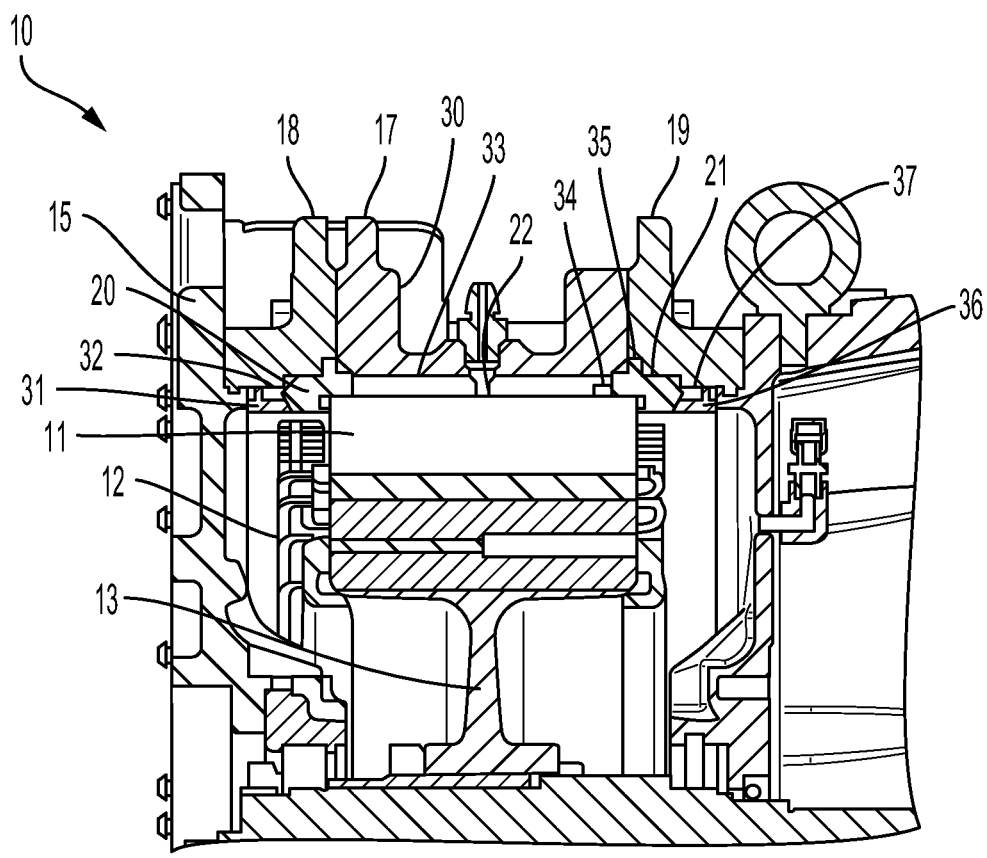
FIG. 2 is another cross-sectional view illustrating an embodiment of a cooling jacket suitable for use in the electric motor of FIG. 1.

Referring to FIG. 2, in one embodiment, the first spray ring 20 is provided with a shoulder 30. The shoulder 30 is coupled to the first housing member 18 and the cooling jacket 17. The first spray ring 20 is provided with a number of orifice openings 31 arrayed radially about an inner periphery of the first spray ring 20. The orifice openings 31 are connected to a first fluid channel 32 formed between the first spray ring 20 and the first housing member 18.

In one embodiment, the cooling jacket 17 includes a number of passages 33 aligned axially with respect to the electric motor 10. As will be described herein with reference to FIG. 3, the passages 33 are arranged about an inner periphery of the cooling jacket 17. Each passage 33 is provided with an opening 34 to thereby provide fluid communication between passages 33. The passages 33 and the openings 34 form a serpentine fluid path around the outer periphery of the stator 11.

In one embodiment, the second spray ring 21 is provided with a shoulder 35. The shoulder 35 is coupled to the second housing member 19 and the cooling jacket 17. The second spray ring 21 is provided with a number of orifice openings 36 arrayed radially about an inner periphery of the second spray ring 21. The orifice openings 36 are connected to a second fluid channel 37 formed between the second spray ring 21 and the second housing member 19.

In one embodiment, the first and second spray rings 20, 21 are similarly constructed and arranged, with each spray ring having orifice openings adapted and configured so as to permit spraying (dousing) windings 12 of the stator 11 with cooling fluid. For example, spray ring 20 may be adapted and configured so as to provide (spray) cooling fluid on windings 12 of the stator at one (axial) end of the stator 11, and spray ring 21 may be (positioned opposite the stator from the spray ring 20 and) adapted and configured so as to provide (spray) cooling fluid on windings 12 of the stator at the axially opposite end of the stator 11.

Figure 3:
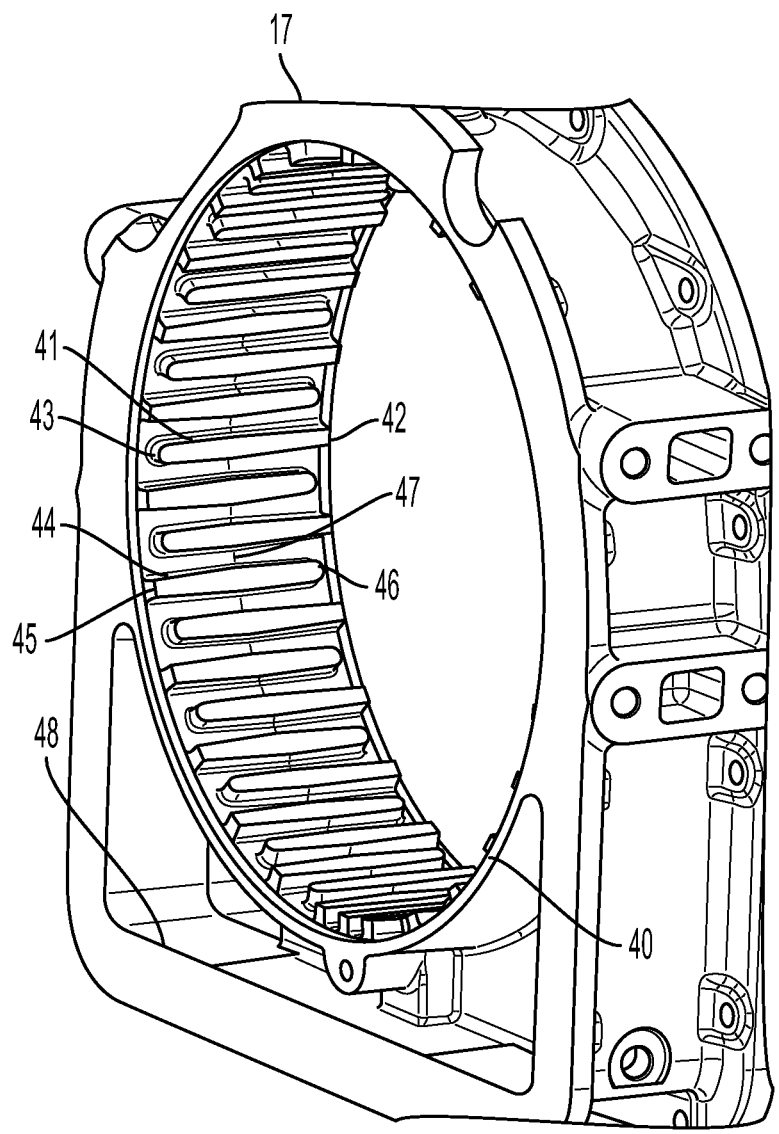
FIG. 3 is a perspective view illustrating the cooling jacket of FIG. 2.

Referring to FIG. 3, in one embodiment, the cooling jacket 17 has a cylindrical body 40 having an inner circumference sized to couple to the stator 11. The cylindrical body 40 has a first array of protuberances 41 arranged radially on the inner periphery of the cylindrical body 40. The first array of protuberances 41 is arranged in contact with an outer circumference of the stator 11. Each of the first array of protuberances 41 has a flat end 42 and a curved end 43. The flat end 42 couples to the second spray ring 21. The curved end 43 is adapted to form the opening 34.

In one embodiment, the cooling jacket 17 has a second array of protuberances 44 arranged radially on an inner circumference of the cylindrical body 40. The second array of protuberances 44 is aligned anti-symmetrically with the first array of protuberances 41. The second array of protuberances 44 is in contact with the outer circumference of the stator 11. Each of the second array of protuberances 44 has a flat end 45 and a curved end 46. The flat end 45 couples to the first spray ring 20. The curved end 46 forms one of the openings 34.

In one embodiment, the first array of protuberances 41 and the second array of protuberances 44 form walls of the passages 33. During operation of the electric motor 10, a cooling fluid such as oil flows in the passages 33 and the openings 34 as a means of heat extraction from the stator 11.

In one embodiment, the cooling jacket 17 has a sump housing 48 connected to the cylindrical body 40. The sump housing 48 is a generally hollow cavity configured to collect and distribute cooling fluid flowing from the passages 33 and orifices 31, 36.

Figure 4:
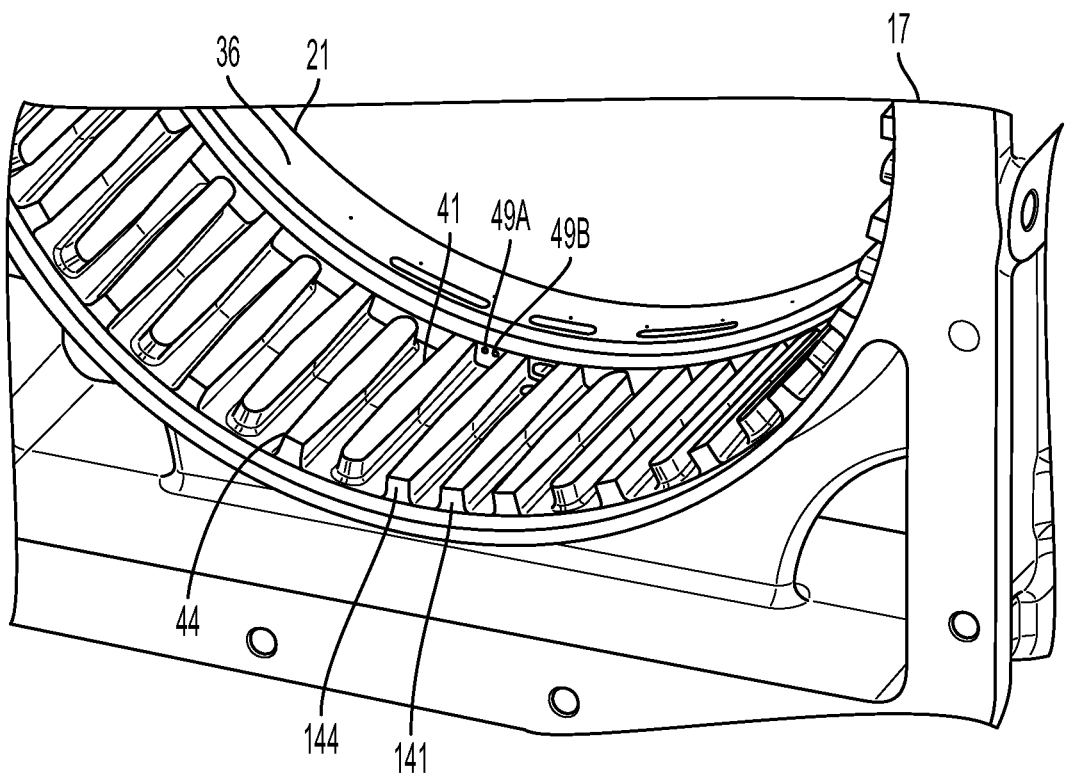
FIG. 4 is a partial perspective view illustrating certain features of the cooling jacket of FIG. 2.

Referring to FIG. 4, in one embodiment, the cooling jacket 17 is provided with a first dam 141 and a second dam 144. The first dam 141 and the second dam 144 are protuberances that are formed axially across the full width of the cylindrical body 40. The first dam 141 and the second dam 144 block the fluid flow from the passages 33 and the openings 34 to thereby direct fluid to a set of inlet ports 49A, 49B. In one embodiment, the cooling jacket 17 is provided with a number of supply ports 49. In some embodiments, there are multiple supply ports 49A, 49B configured to provide fluid communication between the passages 33 and the second spray ring 21, for example. In other embodiments, there is one supply port 49. The supply ports 49A, 49B are in fluid communication with the fluid channels 32, 37.

In some embodiments, the supply ports 49A, 49B are cross drilled holes in the cooling jacket 17 to provide an internal route for fluid between the passages 33 and the fluid channels 32, 37. In other embodiments, the supply ports 49A, 49B are configured to couple to an external tube or pipe that routes fluid from the passages 33 to the fluid channels 32, 37.

In this way, a cooling jacket for an electric motor having a stator, according to some embodiments, comprises a cylindrical body having a first plurality of protuberances arrayed radially on an inner periphery of the body, the first plurality of protuberances in contact with an outer circumference of the stator; a second plurality of protuberances arrayed radially on an inner periphery of the body and aligned anti-symmetrically with the first plurality of protuberances, the second plurality of protuberances in contact with the outer circumference of the stator, wherein the first plurality and the second plurality of protuberances form a plurality of passages for a cooling fluid; an inlet passage connected to one of the plurality of passages; and an outlet passage connected to one of the plurality of passages. The cooling jacket may further comprise a sump housing coupled to one side of the cylindrical body. The outlet passage may be arranged in proximity (or proximate) to the sump housing. The inlet passage may be arranged on an opposite side of the cylindrical body to the outlet passage.

Referring to FIG. 5, in one embodiment, the cooling jacket 17 is formed from a casting process using a casting mold 50. It should be appreciated that the casting mold 50 depicted in FIG. 5 is a simplified schematic illustration depicting certain features of the casting mold 50, and the casting mold 50 may include a variety of additional features based on the desired final shape of the cooling jacket 17.

In one embodiment, the casting mold 50 is provided with a first cylinder core 51 and a second cylinder core 52. The first cylinder core 51 has a first array of protuberances 53 and a second array of protuberances 54 formed about an outer periphery. The first array of protuberances 53 have a first flat end and a second flat end, wherein the first flat end is generally aligned with one side of the first cylinder core 51, and the second flat end is generally aligned with a second side of the first cylinder core 51. The second array of protuberances 54 has a curved end and a flat end. The second cylinder core 52 is provided with the first array of protuberances 53 and the second array of protuberances 54. Once assembled in the casting mold 50, the first cylinder core 51 is aligned with the second cylinder core 52 by arranging the first array of protuberances 53 in an antisymmetric manner to the second array of protuberances 54. In one embodiment, the first array of protuberances 53 on the first cylinder core 51 connect to the second array of protuberances 54 on the second cylinder core 52. In some embodiments, the first cylinder core 51 is substantially the same as the second cylinder core 52, and alignment of the first cylinder core 51 with respect to the second cylinder core 52 within the casting mold 50 produces the final interior features of the cooling jacket 17. Molten material such as aluminum is poured into the casting mold 50 and allowed to solidify. Arrows depicted in FIG. 5 illustrate a removal direction of the first cylinder core 51 and the second cylinder core 52 for disassembly after casting.

Figure 6:
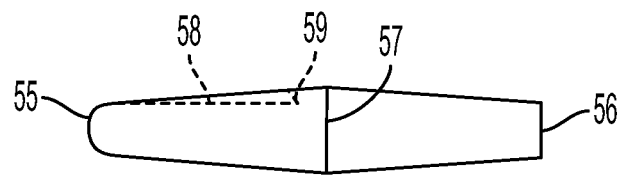
FIG. 6 is a schematic view of an embodiment of a protuberance suitable for use in the casting mode of FIG. 5.

Referring to FIG. 6, in one embodiment, a first protuberance 55 and a second protuberance 56 are suitable for use in the casting mold 50. The first protuberance 55 and the second protuberance 56 are aligned along a parting line 57. The first protuberance 55 is provided with sides 58 having a draft angle 59. It should be appreciated that each side of the first protuberance 55 and the second protuberance 56 may be formed with the draft angle 59. In one embodiment, the draft angle 59 is in the range of 0 deg to 5 deg.

In this way, a method for forming a cooling jacket for an electric motor, according to some embodiments, comprises assembling a first cylinder core to a second cylinder core, wherein the first cylinder core and the second cylinder core each have a cylindrical body having a plurality of protuberances arrayed radially on an outer rim of the bowl-shaped body, wherein the first cylinder core has a first plurality of protuberances and the second cylinder core has a second plurality of protuberances; aligning the first plurality of protuberances to the second plurality of protuberances in an antisymmetric alignment forming a mold assembly; and casting molten material into the mold assembly forming a cast cooling jacket.

Figure 7:
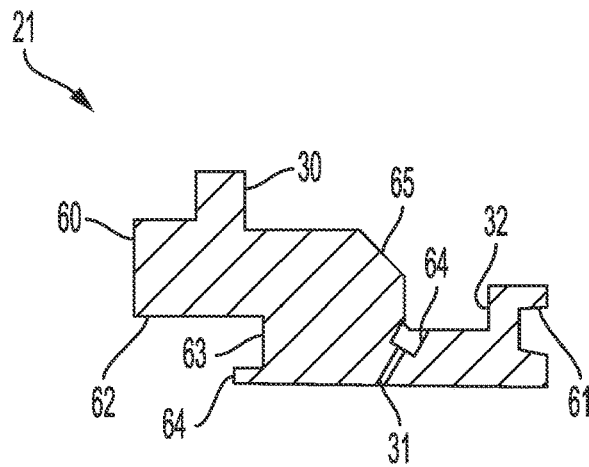
FIG. 7 is a cross-sectional view illustrating an embodiment of a spray ring suitable for use in the electric motor of FIG. 1.

Referring to FIG. 7, in one embodiment, the first spray ring 20 is a generally annular ring provided with the shoulder 30 located on an outer periphery. The first annular ring 20 has a first surface 60 adapted to couple to the cooling jacket 17. For example, the first surface 60 mates with the flat end 45 of the second protuberances 44. The first spray ring 20 is provided with a seal groove 61 located opposite of the first surface 60. The first spray ring 20 is provided with a radial piloting surface 62 located on an inner periphery radially inward of, and adjacent to, the first surface 60: The radial piloting surface 62 couples to the stator 11. An undercut groove 63 extends from the radial piloting surface 62 to form an axial piloting surface 64. The axial piloting surface 64 couples to the stator 11.

In one embodiment, the array of orifice openings 31 are located between the shoulder 30 and the seal groove 61. The orifice openings 31 are provided with a countersunk cavity 64 in proximity to the passage 32. In one embodiments, the orifice openings 31 have a generally circular cross-section. The orifice openings 31 are oblique with respect to the inner periphery, and are aligned to direct fluid to the windings 12.

In one embodiment, the first spray ring 20 is provided with a chamfer surface 65. The chamfer surface 65 provides a sealing surface suitable for using a crush seal o-ring or similar seal between the first spray ring 20 and the first housing member 18.

Figure 8:
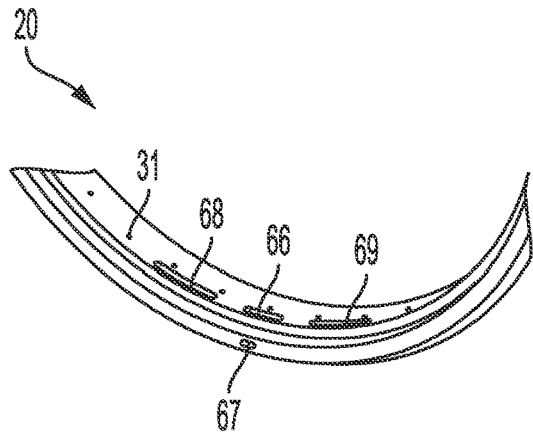
FIG. 8 is a partial perspective view illustrating the spray ring of FIG. 7.
Figure 9:
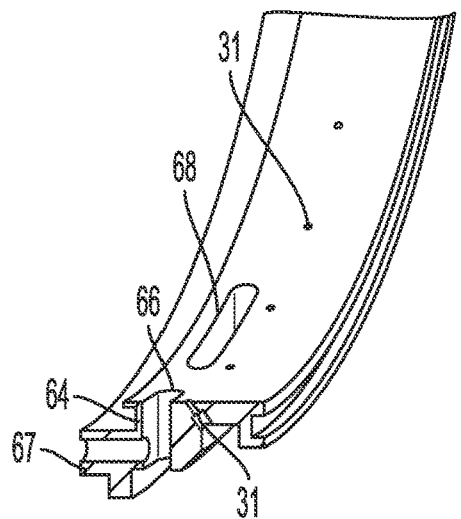
FIG. 9 is a cross-sectional perspective view illustrating the spray ring of FIG. 7.

Turning to FIG. 8 and FIG. 9, in one embodiment, the first spray ring 20 is provided with a first drain opening 66 located in proximity to the sump housing 48 once assembled in the electric motor 10. The first drain opening 66 is arranged between the orifice openings 31 and the shoulder 30. The first drain opening 66 provides a fluid path between the inner periphery of the annual ring and a drain port 67. The drain port 67 provides a fluid path through the cooling jacket 17 to the sump housing 48. The first drain opening 66 is positioned between a second drain opening 68 and a third drain opening 69. It should be appreciated that the number and shape of the drain openings is configurable to the desired fluid flow rate from the interior of the electric motor 10 to the sump housing 48. In one embodiment, the second drain opening 68 and the third drain opening 69 provide a fluid path from the inner periphery of the annual ring to the sump housing 48.

Figure 10:
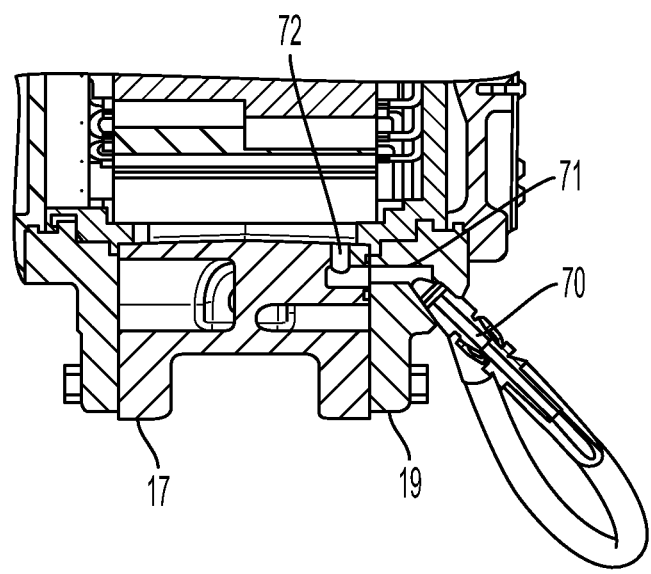
FIG. 10 is a partial cross-sectional view illustrating an embodiment of a cooling jacket suitable for use in the electric motor of FIG. 1.

Referring to FIG. 10, in one embodiment, fluid is supplied from the passages 33 to the fluid channels 32, 37 by routing the fluid out of the cooling jacket 17 and the housing 19. In one embodiment, the electric motor 10 is provided with a hose 70 coupled to the housing 19. The hose 70 has a first end arranged in fluid communication with a port 71 formed in the housing 19. The port 71 intersects a cooling jacket outlet 72. The cooling jacket outlet 72 is positioned to intersect the passages 33. During operation, fluid is delivered through the housing 19 to the fluid channels 32, 37 by the second end (not shown) of the hose 70. It should be noted that the hose 70 may couple to additional components such as heat exchangers, filters, or other fluid devices arranged between the first end of the hose 70 and the second end of the hose 70.

Figure 11:
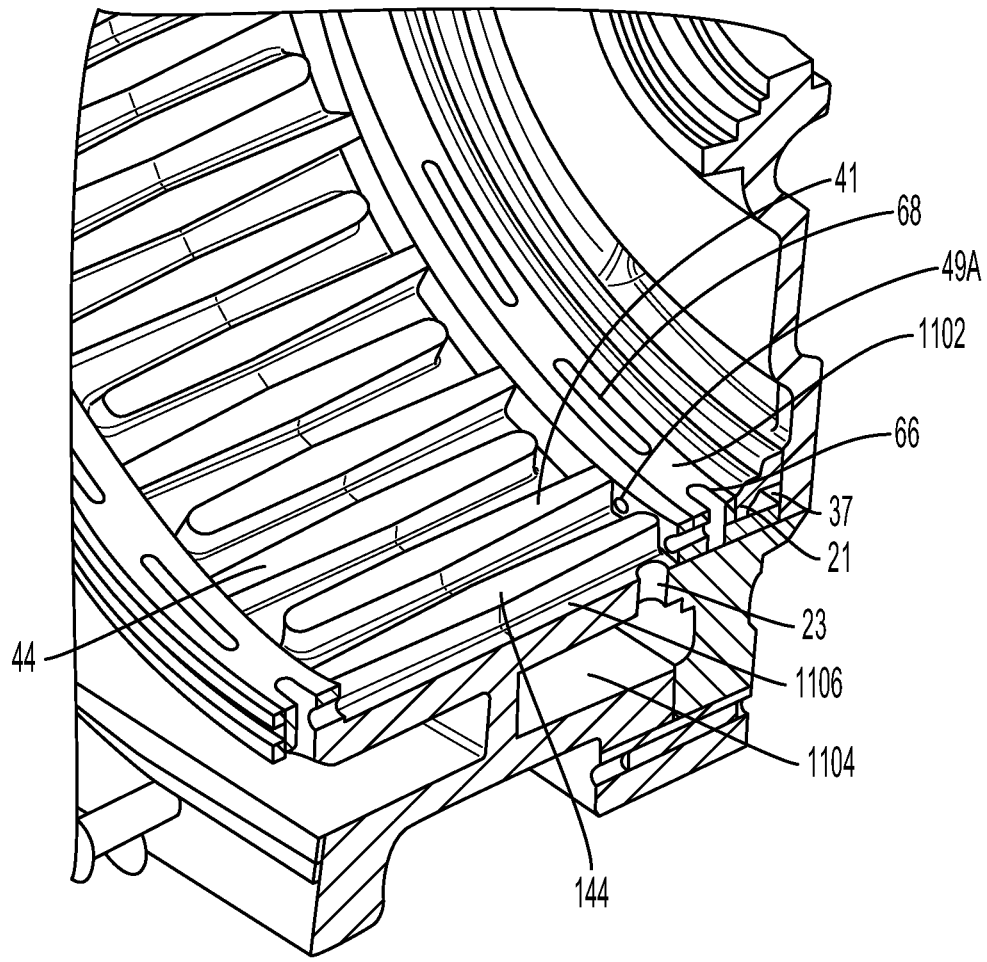
FIG. 11 is a cross-sectional perspective view illustrating an embodiment having internal fluid passages from the cooling jacket to a spray ring.

Next, FIG. 11 shows a cross-sectional perspective view of a cooling jacket with spray ring, according to one embodiment, cut vertically and axially so as to cut through a passageway 1106 between the second dam 144 (shown) and the first dam 141 (not shown). Internal fluid passages are provided between the cooling jacket serpentine passages and spray ring 21. As shown, cooling fluid may flow downward around each of the fingers (protuberances), e.g., protuberances 44 and 41, and then through an inlet, such as inlet port 49A, fluidly coupling the serpentine passageway of the cooling jacket with the spray ring fluid channel 37 via a cross-drilled passage between the inlet 49A and fluid channel 37 in the region 1102 between spray ring drains 68 and 66. Cooling fluid flows through the inlet 49A, into the fluid channel 37, and is then sprayed from orifices 31 (to cool the stator windings). Cooling fluid then flows downward and through drain openings, such as drain openings 68, 66, and (not shown) 69. From the drain openings, cooling fluid drains from the spray ring into a sump 1104, for example via internal passages from the drain openings to the passageway 1106 between the first dam 141 and the second dam 144, and drain 23 leading to the sump 1104.

Figure 12:
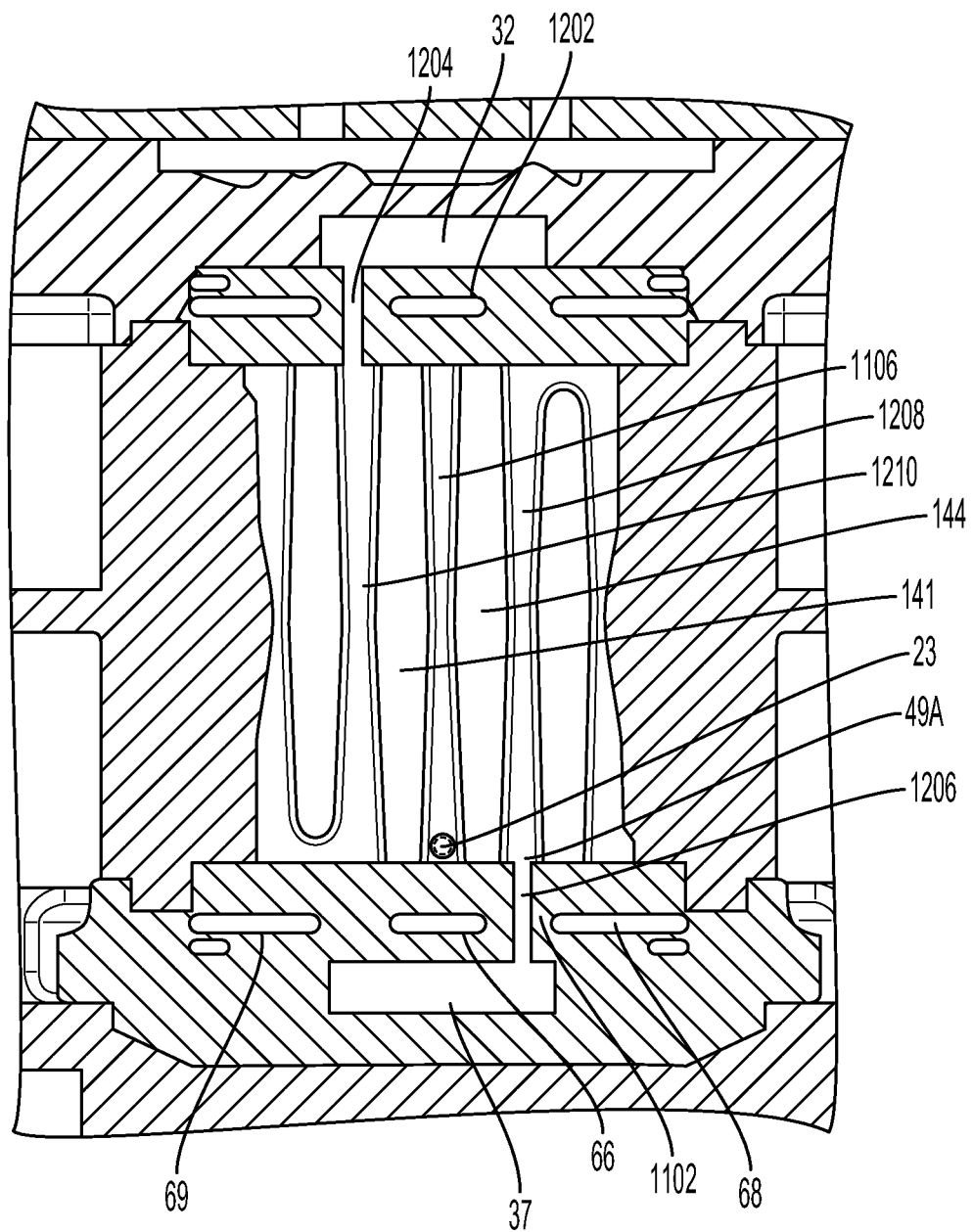
FIG. 12 is a cross-sectional top view illustrating an embodiment having internal fluid passages from the cooling jacket serpentine passages to respective axially opposed spray rings.

FIG. 12 shows a cross-sectional top view of a cooling jacket with axially opposed spray rings, according to one embodiment, cut horizontally and parallel with the sump, and so as to cut through passageways fluidly coupling each side of the cooling jacket serpentine passages and each respective spray rings axially opposite one another. Internal passages are provided between the cooling jacket serpentine passages and each of the spray rings 21, 20. As shown, cooling fluid may flow to the end of serpentine passageway 1208, through inlet 49A and a passageway 1206 that (internally) fluidly couples the cooling jacket passageway 1208 and the spray ring fluid channel 37. In similar fashion, cooling fluid may flow to the end of serpentine passageway 1210, through a passageway 1204 that (internally) fluidly couples the cooling jacket passageway 1210 and the spray ring fluid channel 32. In one embodiment, cooling fluid is able to flow within each of the spray ring fluid channels 37, 32 and then out of the (spray) orifices radially arranged in each spray ring so that cooling fluid is distributed to the windings on each (axially opposite) side of the cooling jacket. Thereafter, the cooling fluid is permitted to drain, via drain openings such as drain openings 66 and 1202, into a sump there below, such as sump 1104.

In this way, an electric motor assembly, according to some embodiments, comprises a non-rotatable stator having a plurality of windings attached to the non-rotatable stator; a rotor arranged coaxially and radially inward of the nonrotatable stator; a shaft coupled to the rotor, where the shaft transmits rotational power; a cooling jacket enclosing the non-rotatable stator, wherein the cooling jacket has a cylindrical body coupled to a sump housing, the cooling jacket comprising a plurality of protuberances arrayed radially on an inner periphery of the cylindrical body, the plurality of protuberances in contact with an outer circumference of the stator forming a plurality of passages; a first spray ring coupled to one end of the cooling jacket; a second spray ring coupled to a second end of the cooling jacket; a first housing member coupled to the cooling jacket, wherein the first housing member couples to the first spray ring to form a first fluid channel; and a second housing member coupled to the cooling jacket, wherein the second housing member couples to the second spray ring to form a second fluid channel. The first fluid channel and the second cooling channel may be in fluid communication with the plurality of passages formed between the cooling jacket and the non-rotatable stator. The first spray ring may further include a first plurality of orifice openings radially arrayed about an inner periphery of the first spray ring. The first plurality of orifice openings may connect to the first fluid channel. The second spray ring may further comprise a second plurality of orifice openings radially arrayed about an inner periphery of the second spray ring. The second plurality of orifice openings may connect to the second fluid channel. The first spray ring may further comprise a first drain passage located in proximity (or proximate) to the sump housing. The second spray ring may further comprise a second drain passage located in proximity (or proximate) to the sump housing. The first plurality of orifice openings may be aligned to deliver a fluid to the plurality of windings. The second plurality of orifice openings may be aligned to deliver the fluid to the plurality of windings. The electric motor assembly may further include an outlet opening in the sump housing. The electric motor assembly may further include an inlet opening in the cooling jacket, the inlet opening located at a distal location to the outlet opening. The first housing member may provide an enclosure around the non-rotatable stator, the rotor, and the shaft. The second housing member may provide an enclosure around the non-rotatable stator, the rotor, and the shaft. The first housing member may comprise a ring member and an end plate.

Also in this way, a spray ring for an electric motor having a stator, according to some embodiments, includes an annular ring having an inner periphery and an outer periphery; a plurality of orifice openings arrayed radially about the inner periphery, the orifice openings intersecting the inner periphery and the outer periphery in an oblique angle; a radial piloting surface located on the inner periphery, the radial piloting surface adapted to couple to the stator; an axial piloting surface located on the inner periphery, the axial piloting surface arranged perpendicular to the radial piloting surface, the axial piloting surface adapted to couple to the stator; and a channel located on the outer periphery, the channel intersecting the plurality of orifice openings, the channel located at a distal location from the axial piloting surface.

The technical effect of providing fluid paths (such as the serpentine passageways for oil flow) via fingers or protrusions extending radially inward from the inner surface of a cooling jacket (with the fluid paths bounded by inner surfaces of the cooling jacket, the exterior cylindrical surface of the stator, and cooling rings (or radial end plates)), in the geometries shown and described herein, and of directing cooling oil from openings in the cooling (or spray) rings to douse the stator windings with the cooling oil, includes improved cooling of the stator exterior surface and improved cooling of the stator windings, using a cooling jacket requiring less machining and fewer component parts during its manufacture.

The described embodiments provide an electric motor cooling jacket comprising a cooling jacket body adapted to enclose a surface of an electric motor stator, the cooling jacket body having protuberances extending therefrom and adapted for contact with the surface of the electric motor stator; and fluid passageways formed by the cooling jacket body, the cooling jacket body protuberances, and the surface of the electric motor stator, with the fluid passageways arranged so as to permit a cooling fluid to flow across the surface of the electric motor stator to remove heat from the electric motor stator. In one embodiment, the protuberances extending from the cooling jacket body comprise a first plurality of protuberances and a second plurality of protuberances, wherein the second plurality of protuberances is aligned anti-symmetrically with the first plurality of protuberances so as to provide a serpentine fluid path across the surface of the electric motor stator. In one embodiment, the cooling jacket further includes an inlet connected to the fluid passageways, the inlet oriented so as to permit the cooling fluid to flow through a serpentine fluid path across the surface of the electric motor stator, and an outlet connected to the fluid passageways and oriented so as to permit the cooling fluid to drain from the fluid passageways. In one embodiment, the cooling jacket body comprises a cylindrically shaped body adapted to enclose an outer circumference of the electric motor stator, and the inlet and outlet are oriented opposite one another within the cooling jacket body so that the cooling fluid flows through the fluid passageways across the outer circumference of the electric motor stator. In one embodiment, the cooling jacket includes a sump coupled to one side of the cylindrical body, wherein the outlet is arranged in proximity to the sump, and wherein the inlet is arranged on an opposite side of the cylindrical body to the outlet. In one embodiment, the cooling jacket includes a first spray ring coupled to one end of the cooling jacket body, the first spray ring having a first plurality of orifices adapted to permit cooling fluid to be sprayed on windings of the electric motor stator. In one embodiment, the cooling jacket includes a second spray ring coupled to an end of the cooling jacket body axially opposite the first spray ring, the second spray ring having a second plurality of orifices adapted to permit cooling fluid to be sprayed on windings of the electric motor stator. In one embodiment, the first spray ring is fluidly coupled with the fluid passageways and the sump so as to permit cooling fluid to flow from the inlet into the fluid passageways, across the outer circumference of the electric motor stator, through the outlet and thereafter through the first plurality of orifices onto the windings of the electric motor stator and to the sump. In one embodiment, the first spray ring and the second spray ring are fluidly coupled with the fluid passageways and the sump so as to permit cooling fluid to flow from the inlet into the fluid passageways, across the outer circumference of the electric motor stator, through the outlet and thereafter through the first plurality of orifices and the second plurality of orifices onto windings of electric motor stator proximate to the first plurality of orifices and the second plurality of orifices, and to the sump. In one embodiment, the protuberances extending from the cooling jacket body are formable using a pair of (preferably substantially similar, or identical) mold halves, wherein a first mold half is used to form the first plurality of protuberances, a second mold half is used to form the second plurality of protuberances, and the first and second mold halves are aligned anti-symmetrically with one another when joined together so that the serpentine fluid path is formed when casting molten material into the joined mold halves to form a cast cooling jacket body.

FIGS. 1-4 and 8-12 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example.

As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

It will be appreciated that the configurations and routines disclosed herein are exemplary in nature, and that these specific embodiments are not to be considered in a limiting sense, because numerous variations are possible. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, are also regarded as included within the subject matter of the present disclosure.

The foregoing description is considered as illustrative only of the principles of the present disclosure. Further, since numerous modifications and changes will readily occur to those skilled in the art, it is not desired to limit the present disclosure to the exact construction and processes shown and described herein. Accordingly, all suitable modifications and equivalents may be considered as falling within the scope of the present disclosure as defined by the claims which follow.

The invention claimed is:

1. An electric motor cooling jacket comprising:
a cooling jacket body having a cylindrical shape and adapted to enclose a surface of an electric motor stator, the cooling jacket body having protuberances extending radially inward therefrom and adapted for contact with the surface of the electric motor stator, each protuberance having an axial protuberance dimension extending axially, a radial protuberance dimension extending radially, and a circumferential protuberance dimension extending transverse to the axial protuberance dimension and transverse to the radial protuberance dimension, wherein, for each of the protuberances, the axial protuberance dimension is greater than the circumferential protuberance dimension, where each protuberance of the protuberances comprises a first end, the first end coupled to one of a first ring and a second ring; and fluid passageways formed by the cooling jacket body, the protuberances of the cooling jacket body, and the surface of the electric motor stator, with the fluid passageways arranged so as to permit a cooling fluid to flow across the surface of the electric motor stator to remove heat from the electric motor stator, and with the fluid passageways configured so as to direct fluid into a serpentine fluid flow path circumferentially downward through each of two opposing halves of the cooling jacket body, each of the two halves extending from a top of the cooling jacket body to a bottom of the cooling jacket body and having the top of the cooling jacket body and the bottom of the cooling jacket body connected via the serpentine fluid path within which the cooling fluid is directed axially back and forth between axial ends of the cooling jacket body as the cooling fluid flows from the top of the cooling jacket body to the bottom of the cooling jacket body, the axial ends of the cooling jacket body comprising the first ring axially opposite the second ring, with the first and second rings configured so as to direct cooling fluid within the serpentine fluid path to the bottom of the cooling jacket body.

2. The cooling jacket of claim 1, wherein the protuberances extending from the cooling jacket body comprise a first plurality of protuberances and a second plurality of protuberances, wherein the first end of each of the first plurality of protuberances is coupled to the first ring, wherein the first end of each of the second plurality of protuberances is coupled to the second ring, and wherein the second plurality of protuberances is aligned anti-symmetrically with the first plurality of protuberances.

3. The cooling jacket of claim 1, further comprising an inlet connected to the fluid passageways, the inlet oriented so as to permit the cooling fluid to flow through the serpentine fluid path across the surface of the electric motor stator, and an outlet connected to the fluid passageways and oriented so as to permit the cooling fluid to drain from the fluid passageways.

4. The cooling jacket of claim 3, wherein the cooling jacket body comprises a cylindrically shaped body adapted to enclose an outer circumference of the electric motor stator, and the inlet and outlet are oriented opposite one another within the cooling jacket body so that the cooling fluid flows through the fluid passageways across the outer circumference of the electric motor stator.

5. The cooling jacket of claim 4, further comprising a sump coupled to one side of the cylindrical body, wherein the outlet is arranged in proximity to the sump, and wherein the inlet is arranged on an opposite side of the cylindrical body to the outlet.

6. The cooling jacket of claim 5, wherein the first ring comprises a first spray ring coupled to one end of the cooling jacket body, the first spray ring having a first plurality of orifices adapted to permit cooling fluid to be sprayed on windings of the electric motor stator.

7. The cooling jacket of claim 6, wherein the second ring comprises a second spray ring coupled to an end of the cooling jacket body axially opposite the first spray ring, the second spray ring having a second plurality of orifices adapted to permit cooling fluid to be sprayed on windings of the electric motor stator.

8. The cooling jacket of claim 6, wherein the first spray ring is fluidly coupled with the fluid passageways and the sump so as to permit cooling fluid to flow from the inlet into the fluid passageways, across the outer circumference of the electric motor stator, through the outlet and thereafter through the first plurality of orifices onto the windings of the electric motor stator and to the sump.

9. The cooling jacket of claim 7, wherein the first spray ring and the second spray ring are fluidly coupled with the fluid passageways and the sump so as to permit cooling fluid to flow from the inlet into the fluid passageways, across the outer circumference of the electric motor stator, through the outlet and thereafter through the first plurality of orifices and the second plurality of orifices onto windings of the electric motor stator proximate to the first plurality of orifices and the second plurality of orifices, and to the sump.

10. The cooling jacket of claim 2, wherein a second end of each of the first plurality of protuberances is spaced away from the second ring, and wherein a second end of each of the second plurality of protuberances is spaced away from the first ring.

11. The cooling jacket of claim 10, wherein the protuberances extending from the cooling jacket body further comprise a third plurality of protuberances, wherein a first end of the third plurality of protuberances is coupled to the first ring, and wherein a second end of the third plurality of protuberances is coupled to the second ring.

12. The cooling jacket of claim 10, wherein the first end is flat.

13. An electric motor assembly comprising:
a non-rotatable stator having a plurality of windings attached to the non-rotatable stator;
a rotor arranged coaxially and radially inward of the non-rotatable stator;
a shaft coupled to the rotor, where the shaft transmits rotational power;
a cooling jacket enclosing the non-rotatable stator, wherein the cooling jacket has a cylindrical body coupled to a sump housing, the cooling jacket comprising a plurality of protuberances arrayed radially on an inner periphery of the cylindrical body, each of the plurality of protuberances extending radially inward and in contact with an outer circumference of the stator forming a plurality of fluid passages, and each of the plurality of protuberances having an axial protuberance dimension extending axially, a radial protuberance dimension extending radially, and a circumferential protuberance dimension extending transverse to the axial protuberance dimension and transverse to the radial protuberance dimension, wherein, for each of the protuberances, the axial protuberance dimension is greater than the circumferential protuberance dimension, wherein the plurality of fluid passages are configured so as to direct fluid into a serpentine fluid flow path circumferentially downward through each of two opposing halves of the cooling jacket, each of the two halves extending from a top of the cooling jacket to a bottom of the cooling jacket and having the top of the cooling jacket and the bottom of the cooling jacket connected via the serpentine fluid path within which a cooling fluid is directed axially back and forth between axial ends of the cooling jacket as the cooling fluid flows from the top of the cooling jacket to the bottom of the cooling jacket, the axial ends of the cooling jacket comprising a first ring axially opposite a second ring, with the first and second rings configured so as to direct cooling fluid within the serpentine fluid path to the bottom of the cooling jacket;

each of the plurality of protuberances comprises a first end and a second end opposite the first end, wherein the first end of each of the plurality of protuberances is coupled to one of the first ring and the second ring, the first ring comprising a first spray ring coupled to one end of the cooling jacket;

the second ring comprising a second spray ring coupled to a second end of the cooling jacket;

a first housing member coupled to the cooling jacket, wherein the first housing member couples to the first spray ring to form a first fluid channel; and a second housing member coupled to the cooling jacket, wherein the second housing member couples to the second spray ring to form a second fluid channel.

14. The electric motor assembly of claim 13, wherein the first fluid channel and the second cooling fluid channel are in fluid communication with the plurality of fluid passages formed between the cooling jacket and the non-rotatable stator.

15. The electric motor assembly of claim 13, wherein the first spray ring further comprises a first plurality of orifice openings radially arrayed about an inner periphery of the first spray ring, wherein the first plurality of orifice openings connect to the first fluid channel, wherein the second spray ring further comprises a second plurality of orifice openings radially arrayed about an inner periphery of the second spray ring, and wherein the second plurality of orifice openings connect to the second fluid channel.

16. The electric motor assembly of claim 15, wherein the first spray ring further comprises a first drain passage located in proximity to the sump housing, and wherein the second spray ring further comprises a second drain passage located in proximity to the sump housing.

17. The electric motor assembly of claim 15, wherein the first plurality of orifice openings is aligned to deliver a fluid to the plurality of windings, and wherein the second plurality of orifice openings is aligned to deliver the fluid to the plurality of windings.

18. The electric motor assembly of claim 16, further comprising an outlet opening in the sump housing and an inlet opening in the cooling jacket, the inlet opening located at a distal location to the outlet opening.

19. The electric motor assembly of claim 13, wherein the first housing member provides an enclosure around the non-rotatable stator, the rotor, and the shaft, and wherein the second housing member provides an enclosure around the non-rotatable stator, the rotor, and the shaft.

20. The electric motor assembly of claim 13, wherein the second end of each of the plurality of protuberances is detached from both the first ring and the second ring.

* * * * *